US006980213B1

(12) United States Patent
Hirose et al.

(10) Patent No.: US 6,980,213 B1
(45) Date of Patent: Dec. 27, 2005

(54) TERMINAL DEVICE FOR MOBILE COMMUNICATION

(75) Inventors: Takako Hirose, Hirakata (JP); Hiromi Wada, Neyagawa (JP); Hidehiko Shin, Moriguchi (JP); Atsunobu Kato, Ebina (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/567,112

(22) Filed: May 8, 2000

(30) Foreign Application Priority Data

May 13, 1999 (JP) .................................. 11-132254

(51) Int. Cl.$^7$ ......................... G06T 11/00; G09G 5/00; H04B 1/38; H04M 1/00; G08B 5/22
(52) U.S. Cl. ...................... 345/467; 345/619; 345/471; 455/566; 340/7.5
(58) Field of Search ............................... 345/467, 471, 345/744, 745, 747, 718, 703, 760, 762, 733, 345/619; 455/3.01, 3.03, 3.04, 566; 340/7.5

(56) References Cited

U.S. PATENT DOCUMENTS

| | | | |
|---|---|---|---|
| 4,766,434 A | 8/1988 | Matai et al. | |
| 5,819,302 A | 10/1998 | Nielsen | |
| 5,845,084 A | 12/1998 | Cordell et al. | |
| 5,867,140 A | 2/1999 | Rader | |
| 6,073,148 A * | 6/2000 | Rowe et al. | 345/471 |
| 6,075,457 A | 6/2000 | Kondo | |
| 6,512,448 B1 * | 1/2003 | Rincon et al. | 340/7.51 |
| 6,559,861 B1 * | 5/2003 | Kennelly et al. | 345/744 |
| 2002/0054097 A1 * | 5/2002 | Hetherington et al. | 345/762 |

FOREIGN PATENT DOCUMENTS

| | | |
|---|---|---|
| EP | 0 876 009 | 11/1998 |
| JP | 62-65528 | 3/1987 |
| JP | 3-198537 | 8/1991 |
| JP | 5-324641 | 12/1993 |
| JP | 7-160462 | 6/1995 |
| JP | 9-127926 | 5/1997 |
| JP | 10-191418 | 7/1998 |
| JP | 2000-066656 * | 3/2000 |
| WO | 9730556 | 8/1997 |

(Continued)

OTHER PUBLICATIONS

Jones M. et al.: "Improving Web Interaction on Small Displays", Computer Networks and ISDN Systems, NL, North Holland Publishing., Amsterdam, vol. 13, No. 11/16, May 17, 1999, pp 1129-1137, XP000861706, ISSN: 0169-7552.

(Continued)

Primary Examiner—Sumati Lefkowitz
Assistant Examiner—Chante Harrison
(74) Attorney, Agent, or Firm—Wenderoth, Lind & Ponack, L.L.P.

(57) ABSTRACT

In a mobile communication terminal device that obtains data including text or an image from an external server through a digital network, a display displays display data DD generated based on data in a first storage unit. A plurality of display modes are predetermined in a display mode switching unit. When instructed by a user while the display data is displayed on the display, the display mode switching unit switches the display mode according to a predetermined order. A display data generator generates the display data DD according to the next display mode. The display displays the display data DD generated by the display data generator. It is thus possible to provide a mobile communication terminal device capable of displaying data while switching among a plurality of display modes (character sets or image display forms) through simpler operation.

10 Claims, 14 Drawing Sheets

FOREIGN PATENT DOCUMENTS

WO      9941920     8/1999
WO      99/65213    12/1999

OTHER PUBLICATIONS

Metter M. et al.: "WAP Enabling Existing HTML Applications", Proceeding First Australasian User Interface Conference. AUIC 2000 (CAT. No. PR00515), Proceeding First Australasian User Interferface Conference. AUIC 2000, Canberra, ACT, Australia, Jan. 31-Feb. 3, 2000, pp 49-57, XP002142531, 1999, Los Alamitos, CA, USA, IEE Comput. Soc. USA, ISBN: 0-7695-0515-5.

Patent Abstracts of Japan, vol. 1999, No. 02, Feb. 26, 1999 & JP 10 307699 A (Nippon Telegr & Amp; Teleph Corp & LT; NTT>), Nov. 17, 1998.

Patent Abstracts of Japan, vol. 1999, No. 03, Mar. 31, 1999 & JP 10 326169 A (Toshiba Corp), Dec. 8, 1998.

* cited by examiner

F I G. 1 1

FOURTH STORAGE UNIT, 2124

| SOURCE ADDRESS | LAST DISPLAY DATE/TIME | PREVIOUS DISPLAY MODE INFORMATION | THE NUMBER OF DISPLAYS |
|---|---|---|---|
| http://www.test.co.jp/index.html | 1999/04/30 10:02 | JIS | 3 |
| http://www.test.co.jp/local/news.html | 1999/04/30 09:56 | SHIFT-JIS | 21 |
| http://www.patent.or.jp/report/main.html | 1999/04/29 20:28 | EUC | 1 |
| http://www.patent.or.jp/report/repl.html | 1999/04/29 19:40 | SHIFT-JIS | 5 |
| ---- | ---- | ---- | ---- |

HI

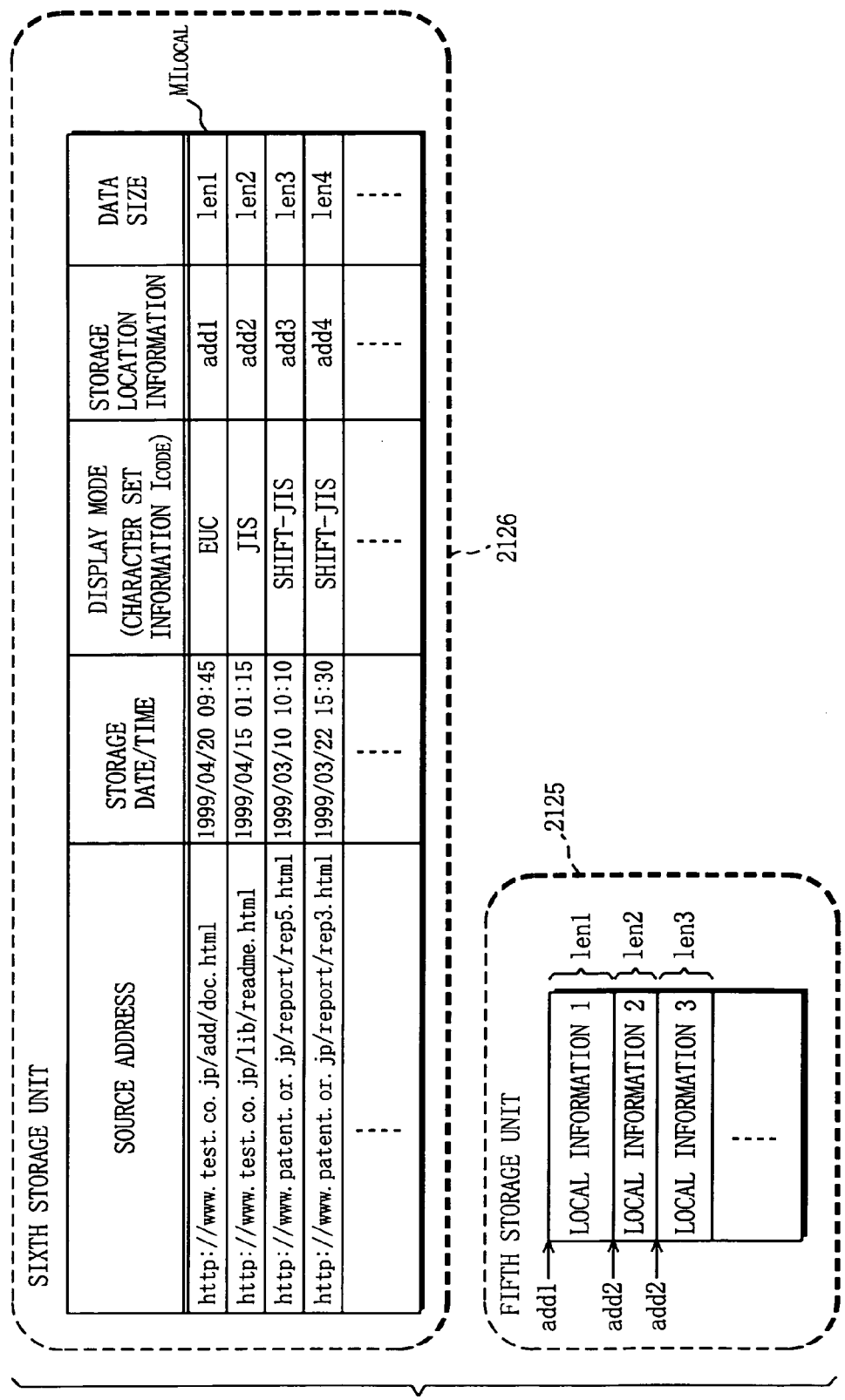

TERMINAL DEVICE FOR MOBILE COMMUNICATION

BACKGROUND OF THE INVENTION

1. Field of the Invention

This invention relates to mobile communication terminal devices capable of displaying text such as contents and E-mails obtained through data communication with an external server via a digital network, and more specifically, to a portable terminal device for mobile communication such as a cellular phone and a personal digital assistant.

2. Description of the Background Art

The use of the Internet has been widely and rapidly spread all over the world in recent years. Various contents are stored in servers on the World Wide Web (such servers are hereinafter referred to as WWW servers). The contents including text and images are created in description language typified by HTML (Hyper Text Markup Language). Creators use a desired character set to create text, and may paste an image onto the created text using reserved words of the description language in use. The size of the image and its pasting position are also specified by the reserved words as desired.

Conventionally, most users browse the contents using personal computers (PCs) on which a WWW browser is installed. The WWW browser analyzes the contents obtained from the WWW servers. Then, the WWW browser determines how the contents should be displayed on a display of the PC by referring to the character sets and image display forms that the user has set in advance.

To set the character set on the WWW browser, the user first makes the display device display a window for setting the character set, and then selects one of a plurality of character sets such as JIS, Shift-JIS, and EUC supported by the WWW browser in use. Also to set the image display form, the user first makes the display device display a window for setting the image display form, and then selects one of a plurality of display forms of images included in the contents (typically, displaying or not displaying of the images).

Conventionally, mobile communication has been often achieved by using a mobile communication terminal device only as a communication device, and a notebook PC. In recent years, however, by installing the WWW browser in the terminal itself, the user can browse the contents stored in the WWW servers only using the terminal.

Like the WWW browser for PCs, the WWW browser installed in the terminals also analyzes the contents obtained from the WWW servers, and by referring to predetermined character sets and display modes, the browser determines how the contents should be displayed on a display of the terminal.

However, hardware performance of terminals is lower than that of PCs due to its size. Here, assume that the character set is set on the WWW browser of the terminal through the following procedure: "display a list of a plurality of character sets" "select a character set". Alternatively, the user may select "auto selection" for automatically selecting the character set. This auto selection, however, puts an enormous load on the CPU in the terminal. In addition, operating a small input device of the terminal might be burdensome to users.

Oftentimes, since users have an understanding of character sets, many PC users can select and set the correct character set according to the above setting procedure to browse the contents when the characters (text) on the displayed screen appear garbled. The "garble" state occurs when the character set to be used in the application software, typically a WWW browser, does not coincide with the character set originally used in text data. In the "garble" state, the terminal cannot decode the character set used in the original text, and, as a result, erroneous data is displayed on the screen of the terminal.

However, more users of the terminals probably do not understand even the system of character sets. Therefore, it is too demanding to make such users select and set the correct character set while viewing the garbled contents.

Under these backgrounds, a user interface in the portable terminal has to be able to set the character set more easily in the portable terminal. The same goes for the image display form.

Further, the terminal can also display an electronic mail (E-mail) received from a mail server by executing a mailer installed in the terminal. The E-mail is constructed of text (HTML, plain text, or the like).

As described above, users are having a growing number of opportunities to deal with text and/or images through the terminal. Therefore, the user interfaces capable of setting the character set and/or image display form more easily are required.

SUMMARY OF THE INVENTION

Therefore, an object of the present invention is to provide a mobile communication terminal device capable of displaying text by switching among a plurality of character sets through easier operation.

Another object of the present invention is to provide a mobile communication terminal device capable of switching a display form of an obtained image through easier operation.

The present invention has the following features to achieve the objects described above.

A first aspect of the present invention is directed to a mobile communication terminal device that obtains data including text or an image from an external server through a digital network, comprising:

a storage unit operable to store the data obtained from the external server;

a display data generator operable to generate display data based on the data stored in the storage unit;

a display operable to display the display data generated by the display data generator; and a switching unit operable to switch a present display mode to a next display mode which is selected from among a predetermined plurality of display modes in a predetermined order when a user makes an instruction while the display is displaying the display data, wherein:

the display data generator generates display data according to the next display mode and sends the display data to the display; and the display displays the display data sent from the display data generator.

According to a second aspect, in the first aspect:

the plurality of display modes are character sets that are different from one another;

the switching unit switches a present character set to a next character set in the predetermined order when the user makes the instruction while the display is displaying the display data; and the display displays text included in the display data from the display data generator according to the next character set.

According to a third aspect in the first aspect the plurality of display modes are image display forms that are different from one another, the switching unit switches a present display form to a next display form in the predetermined order when the user makes the instruction while the display is displaying the display data, and the display displays an image of the display data from the display data generator according to the next display form.

As described above, in the first to third aspects, the switching unit switches the display mode (character set or image display mode) in response to the user's instruction. The display data generator generates display data according to the switched display mode, thereby causing the data displayed on the display to be automatically updated in response to the switching of the display mode. Therefore, only by making a predetermined instruction, the user can view data in another display mode when the data is not displayed as desired due to the difference of the display mode. According to the first to third aspects, it is thus possible to provide a mobile communication terminal device capable of switching a display mode (character set or image display form) with an easy procedure of making a predetermined instruction.

According to a fourth aspect, in the first aspect, data described in HTML (Hyper Text Markup Language) is stored in the external server.

According to a fifth aspect, in the first aspect, an electronic mail including at least text is stored in the external server.

According to a sixth aspect, in the first aspect, the terminal device is adapted to be able to make telephony communication, and a communication protocol for accessing to the external server is implemented therein.

A seventh aspect of the present invention is directed to a mobile communication terminal device obtaining data from an external server through a digital network and displaying the data on a screen, comprising:
  a first storage unit operable to temporarily store the data obtained from the external server;
  a determination unit operable to determine a display mode for use in displaying data stored in the first storage unit; and
  a second storage unit operable to store management information including a source address of the data stored in the first storage unit and a display mode previously used for displaying the data, wherein:
  the determination unit determines that the data stored in the first storage unit is displayed in a display mode previously used referring to the management information in the second storage unit.

An eighth aspect of the present invention is directed to a mobile communication terminal device obtaining data from an external server through a digital network and displaying the data on a screen, comprising:
  a determination unit operable to determine a display mode for use in displaying the obtained data; and
  a storage unit operable to store history information including a source address of data previously obtained and a display mode previously used for displaying the data, wherein:
  the determination unit:
    when new data is obtained from the external server, searches the storage unit for history information including a same source address as the source address of the new data; and
    determines that the new data is displayed in a display mode included in the history information.

A ninth aspect of the present invention is directed to a mobile communication terminal device obtaining data from an external server through a digital network and display the data on a screen, comprising:
  a determination unit operable to determine a display mode for use in displaying the obtained data;
  a first storage unit operable to store the data being displayed as local information; and
  a second storage unit operable to store management information including a display mode used for storing the local information in the first storage unit, wherein:
  the determination unit:
    when the local information stored in the first storage unit is to be displayed on the screen as data, searches the second storage unit for management information of the local information; and
    when the management information is found, determines that the local information is displayed on the screen using the used display mode included in the management information.

According to the seventh to ninth aspects, the display mode of the data previously obtained is stored in the terminal, and the present display mode is determined based on the stored display mode. Referring to the previous display mode increases the possibility that the present display data is displayed as the user desires. Therefore, compared with the first aspect, the number of user's operations of making an instruction for switching the display mode can be reduced. It is thus possible to provide a mobile communication terminal device having better usability.

A tenth aspect of the present invention is directed to, in a mobile communication terminal device capable of accessing to an external server through a digital network, a method for displaying text or image on a screen, the method comprising the steps of:
  storing data obtained from the external server;
  generating display data based on the data stored in the storing step;
  displaying the display data generated in the generating step; and
  switching a present display mode to a next display mode which is selected from among a predetermined plurality of display modes in a predetermined order when a user makes an instruction while the display data is being displayed in the displaying step, wherein:
  in the generating step, display data is generated in the next display mode; and
  in the displaying step, the display data generated in the generating step is displayed.

An eleventh aspect of the present invention is directed to, in a mobile communication terminal device capable of accessing to an external server through a digital network, a method of displaying data obtained from the external server on a screen, the method comprising:
  a first storing step of temporality storing the data obtained from the external server;
  a determining step of determining a display mode for use in displaying the data stored in the first storing step; and
  a second storing step of storing management information including a source address of the data and a display mode previously used for displaying the data for each data stored in the first storing step, wherein:
  in the determining step, it is determined that the data is displayed in the display mode previously used by referring to the management information stored in the second storing step when the data stored in the first storing step is displayed.

A twelfth aspect of the present invention is directed to, in a mobile communication terminal device capable of accessing to an external server through a digital network, a method of displaying data obtained from the external server on a screen, the method comprising the steps of:

determining a display mode for use in displaying the obtained data; and storing history information including a source address of data previously obtained and the display mode previously used for displaying the data, wherein:

in the determining step:

when new data is obtained from the external server, history information stored in the storing step including a same source address as the source address of the new data is searched; and it is determined that the new data is displayed in the previous display mode included in the history information.

A thirteen aspect of the present invention is directed to, in a mobile communication terminal device capable of accessing to an external server through a digital network, a method of displaying data obtained from the external server on a screen, the method comprising the steps of:

determining a display mode for displaying the obtained data;

storing the data being displayed as local information; and storing management information including a display mode used when the local information is stored in the storing step, wherein:

in the determining step:

when the local information stored in the storing step is displayed as the data on the screen, the management information stored in the storing step including management information of the local information is searched for; and it is determined that the local information is displayed on the screen in the display mode included in the management information.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram showing an example of history information HI stored in a fourth storage unit 2124;

FIG. 14 is a diagram showing an example of management information $MI_{LOCAL}$ stored in a sixth storage unit 2126.

DESCRIPTION OF THE PREFERRED EMBODIMENTS

Figure 1:
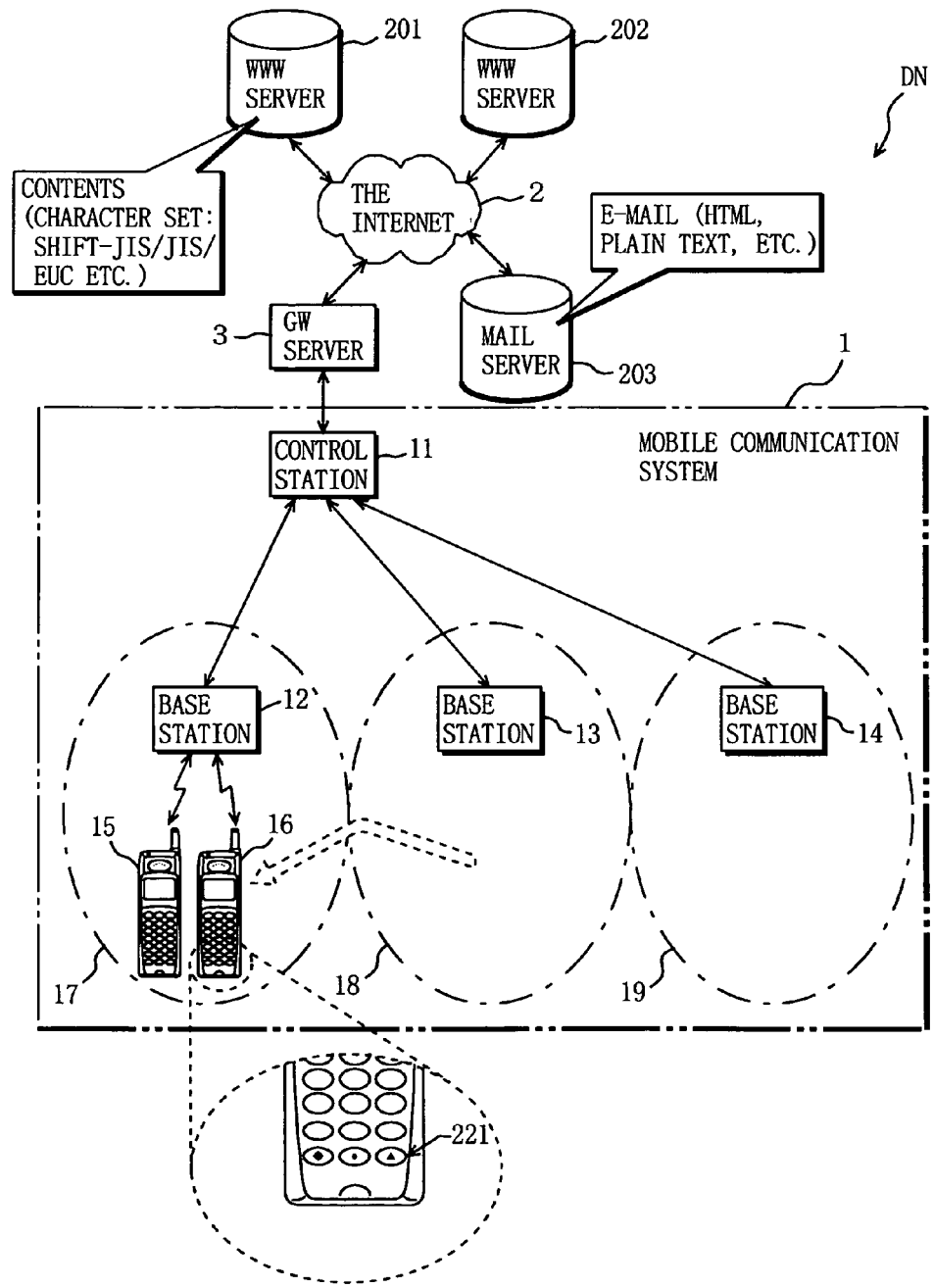
FIG. 1 is a schematic diagram illustrating a digital network DN in which a terminal of the present invention is included.

FIG. 1 shows the entire structure of a digital network DN in which a portable terminal device for mobile communication of the present invention is included. In the digital network DN, a mobile communication system 1 and the Internet 2 are included.

The mobile communication system 1 includes at least one control station 11, a plurality of base stations, and a plurality of terminal devices (terminals) for mobile communication. In the present embodiment, by way of example only, the mobile communication system 1 includes base stations 12 to 14 and terminals 15 and 16.

The control station 11 controls the base stations 12 to 14 each connected thereto through bidirectional communication.

The base stations 12 to 14 control radio zones 17 to 19, respectively.

The terminals 15 and 16 are carried by users to be freely moved around the entire service area covered by the mobile communication system 1. The service area is composed of all radio zones 17 to 19 where the base stations 12 to 14 are respectively located. The terminals 15 and 16 perform wireless communication by using a predetermined multiple access method with the base stations 12 to 14 of the radio zones 17 to 19 where the terminals are presently located, respectively. The multiple access method includes, but is not limited to, CDMA (Code Division Multiple Access), TDMA (Time Division Multiple Access), and FDMA (Frequency Division Multiple Access).

The terminals 15 and 16 communicate with other terminals through any of the base stations 12 to 14 in use and the control station 11 for speech communication between users.

Further, in FIG. 1, at least one WWW (World Wide Web) server (in the drawing, WWW servers 201 and 202) and/or at least one mail server 203 is connected to the Internet 2.

The WWW servers 201 and 202 store various contents each including text and/or image data.

The text is often created in description language such as HTML (Hyper Text Markup Language). A content creator can use various character sets to create text.

In the present embodiment, a character set is a predetermined set of characters in which each character is uniquely represented by a bit string of one byte (single-byte) or multiple bytes (two or more bytes). ASCII (American Standard Code for Information Interchange) is a typical example of single-byte character sets. EUC (Extended Unix Code), SHIFT-JIS, and Unicode are typical examples of multi-byte character sets. In JIS (Japanese Industrial Standards), each of the English characters and numerals is represented by one byte, and each of the Kanji characters is represented by two bytes.

The content creator may paste an image onto the created text using reserved words of the description language in use.

The creator specifies the size of the image and a pasting position of the image as he/she desires.

The mail server 203 stores E-mails destined for the terminal 15 and/or the terminal 16. E-mails are composed mainly of text, but may be composed of description language such as HTML. Senders of E-mails can use various character sets as they desire.

A gateway server (hereinafter referred to as a GW server) 3 connects the mobile communication system 1 and the Internet 2. A communication protocol (Hyper Text Transfer Protocol or Wireless Application Protocol) that enables the terminals 15 and 16 to access to the Internet 2 individually and without the help of a notebook PC is further implemented in the terminals 15 and 16. With such protocol, the terminals 15 and 16 can operate as WWW browsers, thereby being capable of obtaining contents from the WWW server 201 or 202 on the Internet 2. Furthermore, the terminals 15 and 16 can also operate as mailers, thereby being capable of accessing to the mail server 203 so as to obtain E-mails.

As described above, the terminals 15 and 16 can provide users at least with functions of telephony, browsing, and/or mailing. To achieve such functions, the terminals 15 and 16 have a hardware structure as shown in FIG. 2.

Figure 2:
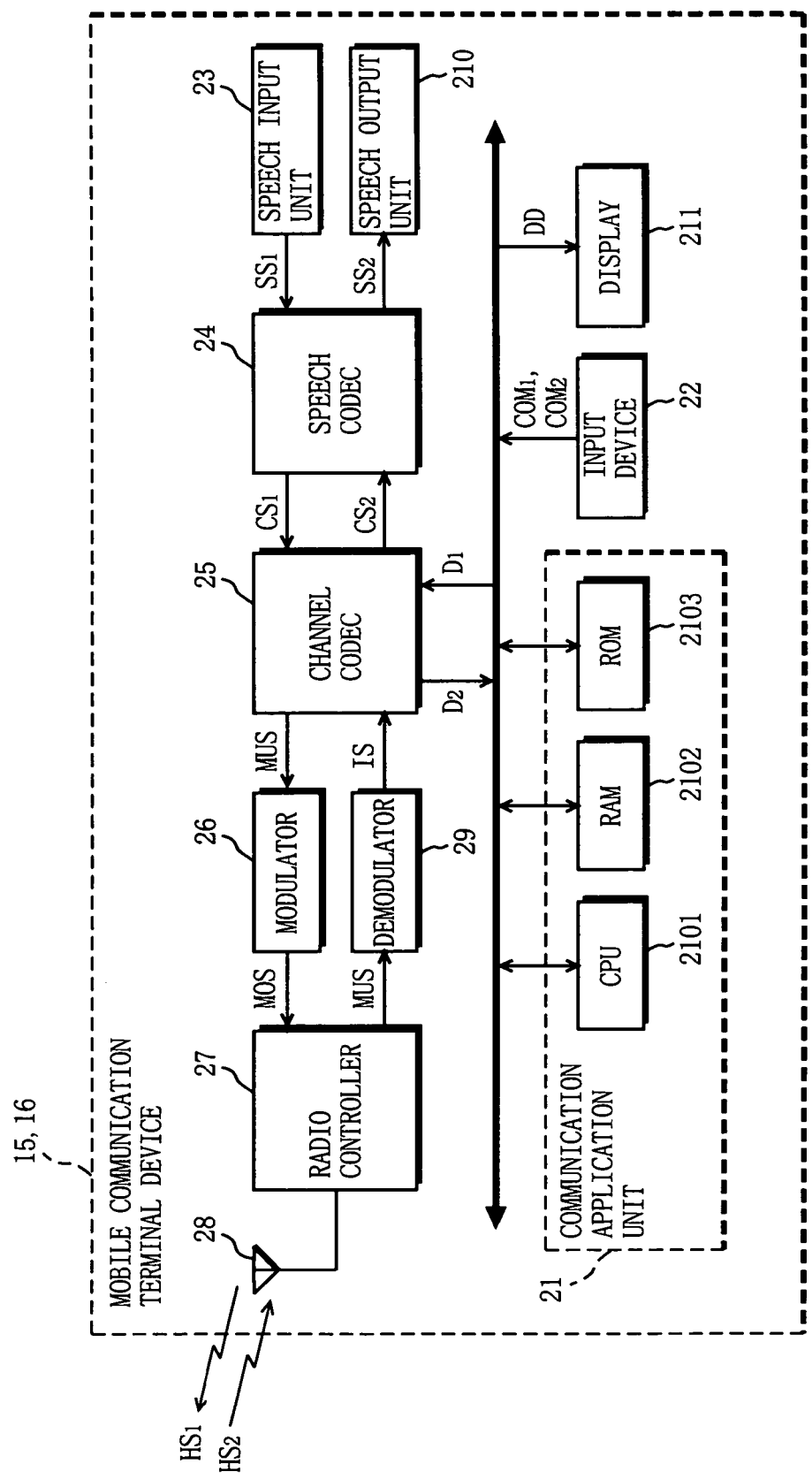
FIG. 2 is a block diagram showing a hardware structure of terminals 15 and 16 of FIG. 1.

In FIG. 2, the terminals 15 and 16 each include a communication application unit 21, an input device 22, a speech input unit 23, a speech CODEC 24, a channel CODEC 25, a modulator 26, a radio controller 27, an antenna 28, a demodulator 29, a speech output unit 210, and a display 211. Since the terminals 15 and 16 have the same structure, the terminal 15 is hereinafter taken as a typical example of the terminals. Further, hereinafter assume that the contents desired by the terminal 15 are stored in the WWW server 201.

The communication application unit 21 includes a CPU 2101, RAM 2102, and ROM 2103. Using the RAM 2102, the CPU 2101 operates according to a program stored in the ROM 2103 to provide users with the functions of telephony, browsing, and/or mailing.

The input device 22 includes a predetermined number of buttons or keys, or at least one jog dial, joystick, camera, or microphone. The user operates the input device 22 to input information required for telephony, for browsing the contents, or making instructions required for receiving/displaying an E-mail. In response to the user's operation, the input device 22 generates input information.

Note that, when the terminal 15 provides the user with the browsing function, a function of issuing a command $COM_1$ "switch the character set" is assigned to any one of the components of the input device 22. In the present embodiment, the function of issuing the command $COM_1$ is assigned to a key 221 shown in FIG. 1. To instruct the terminal 15 that provides the browsing function to switch character sets, the user operates the key 221. Similarly, a function of issuing a command $COM_2$ "switch the display form" is assigned to any one of the components of the input device 22. To instruct the terminal 15 that provides the browsing function to switch the display form, the user operates the component to which the function of issuing the command $COM_2$ has been assigned. In response to the instruction, the input device 22 generates command $COM_1$ or $COM_2$ as input information.

The speech input unit 23 is composed typically of a microphone, converting speech inputted by the user into an electric signal equivalent thereto (hereinafter referred to as speech signal $SS_1$) The speech signal $SS_1$ is provided to the speech CODEC 24.

The speech CODEC 24 has the function of, but is not limited to, encoding the speech signal $SS_1$ outputted from the speech input unit 23 according to a predetermined encoding process so as to generate an encoded signal $CS_1$.

The channel CODEC 25 has the function of, but is not limited to, multiplexing the encoded signal $CS_1$ received from the speech CODEC 24 on the channel shared with other terminals. This multiplexing is based on the above-described multiple access method under the control of the communication application unit 21 so as to generate a multiplex signal MUS.

In some cases, data $D_1$ may be sent from the communication application unit 21 to the channel CODEC 25. Such data $D_1$ includes data required for obtaining contents from the WWW server 201, and data required for receiving an E-mail from the mail server 203. The channel CODEC 25 also generates a multiplex signal MUS from the data $D_1$ received from the communication application unit 21.

The modulator 26 subjects the multiplex signal MUS generated in the channel CODEC 25 to modulation according to a predetermined modulation scheme such as, typically, π/4 shift DQPSK (Differential Quadrature Phase Shift Keying). With such modulation scheme, the modulator 26 generates a modulated signal MOS.

The radio controller 27 has the function of, but is not limited to, superimposing the modulated signal MOS outputted from the modulator 26 onto a carrier signal having a predetermined radio-frequency band so as to generate a high-frequency signal $HS_1$. The high-frequency signal $HS_1$ is radiated from the antenna 28 into the air and received by the base station 12, 13 or 14 shown in FIG. 1.

A high-frequency signal $HS_2$ is sent from the base station 12, 13 or 14 to the terminal 15. This high-frequency signal $HS_2$ is generated in a similar manner as the high-frequency signal $HS_1$, but is different in that the high-frequency signal $HS_2$ is generated based on the contents obtained from the WWW server 201 or an E-mail received from the mail server 203.

The radio controller 27 receives the high-frequency signal $HS_2$ included in the predetermined radio frequency band among signals induced by the antenna 28. The radio controller 27 also down-converts the received high-frequency signal $HS_2$ to generate an intermediate signal IS having an intermediate-frequency.

The demodulator 29 demodulates (detects) the intermediate signal IS generated by the radio controller 27 with a predetermined scheme to generate a demodulated signal DS.

On the demodulated signal DS generated by the demodulator 29, a signal to another terminal is multiplexed. Therefore, the channel CODEC 25 separates a signal for its own terminal from such demodulated signal DS. The separated signal includes the encoded signal $CS_2$ or the data $D_2$. The encoded signal $CS_2$ is a signal encoded based on a voice of the party on the other end, while the data $D_2$ composes the contents obtained from the WWW server 201 or the E-mail received from the mail server 203. The channel CODEC 25 sends the separated signal to the communication application unit 21.

The communication application unit 21 identifies the received signal as the encoded signal $CS_2$ or the data $D_2$. The communication application unit 21 subjects the identified encoded signal $CS_2$ to a predetermined process, and sends the processed encoded signal $CS_2$ to the speech CODEC 24 through the channel CODEC 25.

The speech CODEC 24 decodes the encoded signal $CS_2$ received from the channel CODEC 25 to reproduce the speech signal $SS_2$. The reproduced speech signal $SS_2$ is an electric signal equivalent to the voice of the party on the other end.

The speech output unit 210 is composed typically of a speaker, discharging sound outside based on the speech signal $SS_2$ reproduced in the speech CODEC 24. The voice of the party is thus sent to the user of the terminal 15.

On the other hand, when identifying the encoded signal $CS_2$ received from the channel CODEC 25 as the data $D_2$, the communication application unit 21 determines the display mode for displaying the data $D_2$ on the screen of the display 211, and then generates display data DD.

The display 211 displays the display data DD generated by the communication application unit 21 on the screen.

Figure 3:
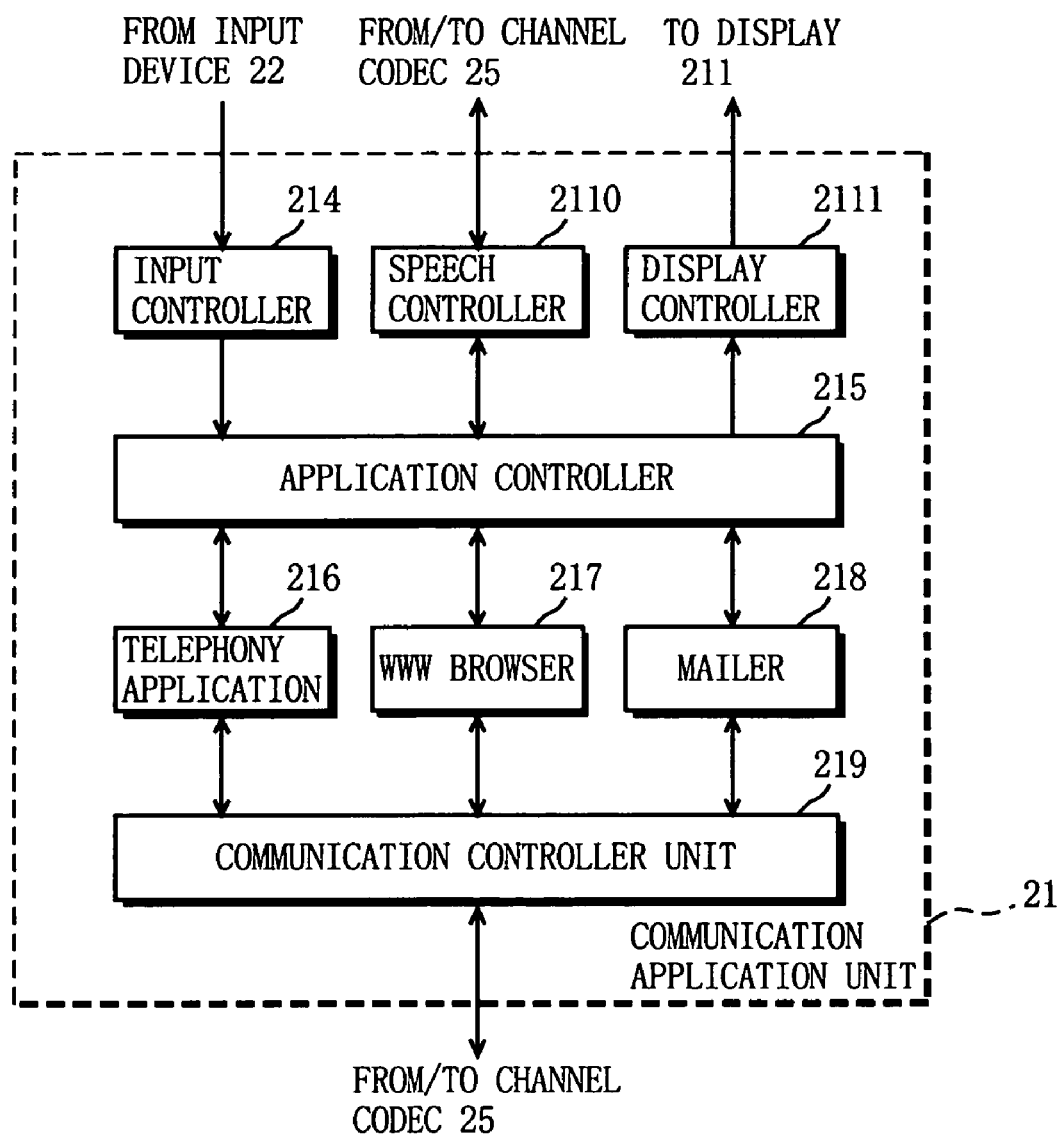
FIG. 3 is a diagram showing a functional block structure of a communication application unit 21 of FIG. 2.

The present embodiment is characterized by a user interface realized by the input device 22 and the communication application unit 21. To achieve such interface, the communication application unit 21 is constructed of, as shown in FIG. 3, an input controller 214, an application controller 215, a telephony application 216, a WWW browser 217, a mailer 218, a communication controller 219, a speech controller 2110, and a display controller 2111.

The input controller 214 receives input information from the input device 22, and then provides the input information to the application controller 215.

The application controller 215 has the function of, but is not limited to, controlling switching of a plurality of applications installed in the terminal 15. The application controller 215 also controls the receiving/transmitting of information from/to the input controller 214, each of the plurality of applications, the speech controller 2110, and the display controller 2111.

In the present embodiment, the telephony application 216, the WWW browser 217, and the mailer 218 are installed as the plurality of applications. However, the terminal 15 may have other applications installed therein.

The telephony application 216 enables the terminal 15 to provide users with the telephony function. In brief, when receiving a telephone number of the party on the other, end from the input controller 214 through the application controller 215, the telephony application 216 requests the communication controller 219 to make connection for an outgoing call. For an incoming call, the telephony application 216 subjects the encoded signal $CS_1$ or $CS_2$ received from the audio controller 2110 through the application controller 215 to a predetermined process, and then supplies the processed encoded signal $CS_1$ or $CS_2$ to the channel CODEC 25 through the application controller 215 and the audio controller 2110.

The WWW browser 217 provides the browsing function. In brief, when notified of the storage location of the contents desired by the user through the input controller 214 and the application controller 215, the WWW browser 217 generates a request for the contents and then supplies the request to the communication controller 219.

The communication controller 219 controls communication with the WWW server 201 in which the desired contents are stored to provide the contents constructed of the data $D_2$ received after a request for obtaining the contents to the WWW browser 217 is sent as data $D_1$. When receiving the contents, the WWW browser 217 determines the character set for use in displaying text included in the contents on the screen. This operation is part of processing for determining the display mode, and will be described later in detail. The communication application unit 21 also determines the display mode when the image included in the contents is displayed on the screen. This operation is also part of processing for determining the display mode, and will also be described later in detail.

The WWW browser 217 further generates the display data DD for display on the screen after analyzing the contents and performing other processing, and then supplies the generated display data DD to the display 211 through the application controller 215 and the display controller 2111.

The mailer 218 provides the mailing function. In brief, the mailer 218 has the function of, but is not limited to, receiving an E-mail from the mail server 203 through, for example, the communication controller 219.

After receiving the E-mail, the mailer 218 determines, upon request from the user, the character set for use in displaying the text of the E-mail. The mailer 218 also determines, as required, the display form when the image attached to the E-mail is displayed on the screen. Then, the mailer 218 generates and supplies display data DD for displaying the E-mail on the screen to the display 211 through the application controller 215 and the display controller 2111.

Switching the display mode (character set and display form) is now described in detail by taking the operation of the WWW browser 217 as an example. Prior to that, a detailed functional block structure of the WWW browser 217 is described with reference to FIG. 4. The WWW browser 217 of FIG. 4 is hereinafter referred to as a WWW browser $217_1$ for the purpose of description.

Figure 4:
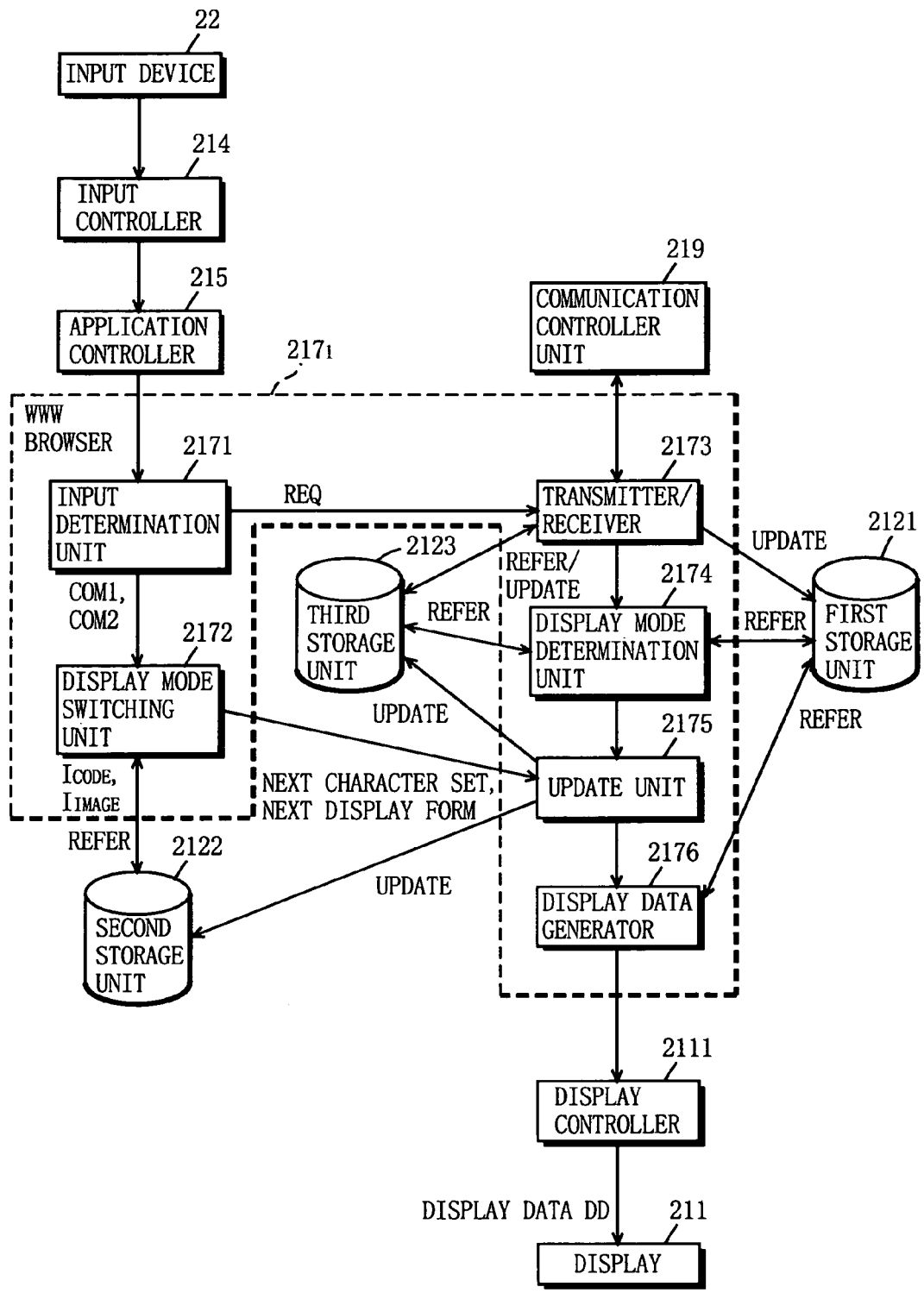
FIG. 4 is a diagram showing a functional block structure of a WWW browser $217_1$.

In FIG. 4, the WWW browser $217_1$ includes an input determination unit 2171, a display mode switching unit 2172, a transmitter/receiver 2173, a display mode determination unit 2174, an update unit 2175, and a display data generator 2176.

Further, the WWW browser $217_1$ uses first to third storage units 2121 to 2123 for switching the display mode. In the present embodiment, the storage areas in the RAM 2102 shown in FIG. 2 are assigned as the first to third storage units 2121 to 2123.

To the input determination unit 2171, input information from the input device 22 is provided through the input controller 214 and the application controller 215. In the present embodiment, the input information includes the commands $COM_1$ and $COM_2$ and a request REQ for obtaining the contents from the WWW server 201. The input determination unit 2171 determines whether the input information is a command or request. If the input information is the request REQ, the input determination unit 2171 provides the request REQ to the transmitter/receiver 2173. If the input information is the command $COM_1$ or $COM_2$, the input determination unit 2171 provides the command to the display mode switching unit 2172.

The display mode switching unit 2172 determines whether the received command is the command $COM_1$ or $COM_2$, and then accesses to the second storage unit 2122.

Here, the second storage unit 2122 stores at least display mode information of the contents now on display on the display 211.

In the present embodiment, the display mode information has two types: character set information $I_{CODE}$ and display form information $I_{IMAGE}$. Both types are used for generating the display data DD based on the contents. The character set information $I_{CODE}$ specifies the character set of the text now on display. Assuming that the WWW browser $217_1$ supports "EUC", "JIS", and "SHIFT-JIS", the character set information $_{CODE}$ represents one of these character sets. The display form information $I_{IMAGE}$ specifies the display form of an image now on display, representing any one of "Original size", "Just size", or "No display". "Original size" means that the image included in the contents is displayed in the size as specified by the reserved words of the description language. "Just size" means that the image is displayed according to the size of the screen. "No display" means that the image is not displayed.

When receiving the command $COM_1$ from the input determination unit 2171, the display mode switching unit 2172 searches the second storage unit 2122 for the character set information $I_{CODE}$ of the contents currently being displayed. The display mode switching unit 2172 then selects a character set that comes next in a predetermined first order after the character set of the text in the contents now on display, and notifies the update unit 2175 of the next character set. In the present embodiment, the first order is predetermined as such, by way of example only, "EUC", "JIS", and then "SHIFT-JIS".

When receiving the command $COM_2$, the display mode switching unit 2172 searches the second storage unit 2122 for the display form information $I_{IMAGE}$ of the contents currently being displayed. The display mode switching unit 2172 then selects a display form that comes next in a predetermined second order after the display form of the image in the contents now on display, and notifies the update unit 2175 of the next display form. In the present embodiment, the second order is predetermined as such, by way of example only, "Original size", "Just size", and then "No display".

Upon receiving the request REQ from the input determination unit 2171, the transmitter/receiver 2173 controls the transmission/receiving of data through the communication controller 219 so as to obtain the contents specified by the user from the WWW server 201. The transmitter/receiver 2173 also refers to management information $MI_{CON}$ stored in the third storage unit 2123 to store the obtained contents in the first storage unit 2121. The transmitter/receiver 2173 then updates the management information $MI_{CON}$ in the third storage unit 2123. The transmitter/receiver 2173 further notifies the display mode determination unit 2174 that the contents have been obtained.

The contents obtained by the transmitter/receiver 2173 are temporarily stored in the first storage unit 2121. The number of contents and the total size storable in the first storage unit 2121 are limited. Therefore, within the limitations, new contents from the transmitter/receiver 2173 can be added to the first storage unit 2121. Beyond the limits, the oldest contents are automatically deleted and the new contents are stored in a space area of the first storage unit 2121 after deletion.

The third storage unit 2123 stores the management information $MI_{CON}$ generated for each of the contents stored in the first storage unit 2121.

Figure 5:
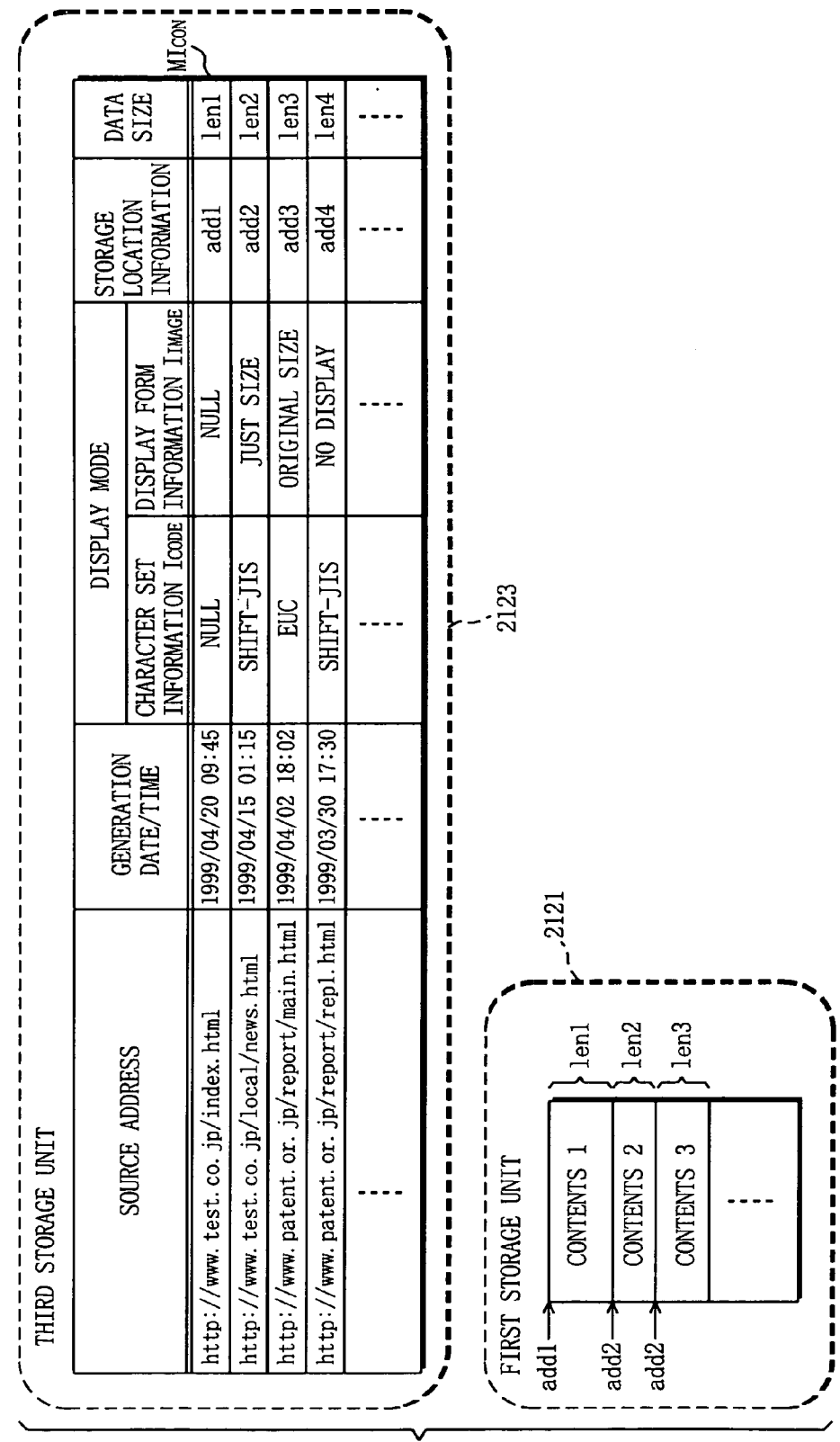
FIG. 5 is a diagram showing an example of management information $MI_{CON}$ stored in a third storage 2123.

FIG. 5 shows an example of such management information $MI_{CON}$. In FIG. 5, a piece of the management information $MI_{CON}$ is composed of a source address of the contents, its generation date and time, previous display mode information, storage location of the contents in the first storage unit 2121, and its data size. Further, the display mode information is composed of the character set information $I_{CODE}$ and the display form information $I_{IMAGE}$. The display mode is not set for the contents that have never been displayed before. In the present embodiment, however, to indicate that the display mode is not set, "NULL" is used to the display mode. Further, although a URL (Uniform Resource Locator) is used as the source address in FIG. 5, other information can be used as long as it can uniquely specify the storage location of the contents in the WWW server 201.

When notified by the transmitter/receiver 2173 that the contents have been obtained, the display mode determination unit 2174 refers to the management information $MI_{CON}$ in the third storage unit 2123 to determine whether the display mode information of the contents to be displayed is set or not. If the previous display mode information has been set (that is, when "NULL" has not been set), the display mode determination unit 2174 notifies the update unit 2175 of the previous display mode information (character set information $I_{CODE}$ and display form information $I_{IMAGE}$) as the next display mode. On the other hand, if the display mode has not been set, the display mode determination unit 2174 notifies the update unit 2175 of a default display mode as the next display mode, or automatically selects a display mode by analyzing the contents themselves to be displayed that are stored in the first storage unit 2121 and then notifies the selected display mode as the next display mode.

When notified of the next display mode by the display mode switching unit 2172 or the display mode determination unit 2174, the update unit 2175 updates the display mode of the contents to be displayed that are stored in the second and third storage units 2122 and 2123 to the next display mode. The update unit 2175 further requests the display data generator 2176 to generate the display data DD of the contents for display according to the next display mode.

In response to the request from the update unit 2175, the display data generator 2176 generates the display data DD of the contents for display according to the specified next display mode, and supplies the generated display data DD through the display controller 2111 to the display 211. The display 211 then displays the display data DD generated in the next display mode on the screen.

Figure 6:
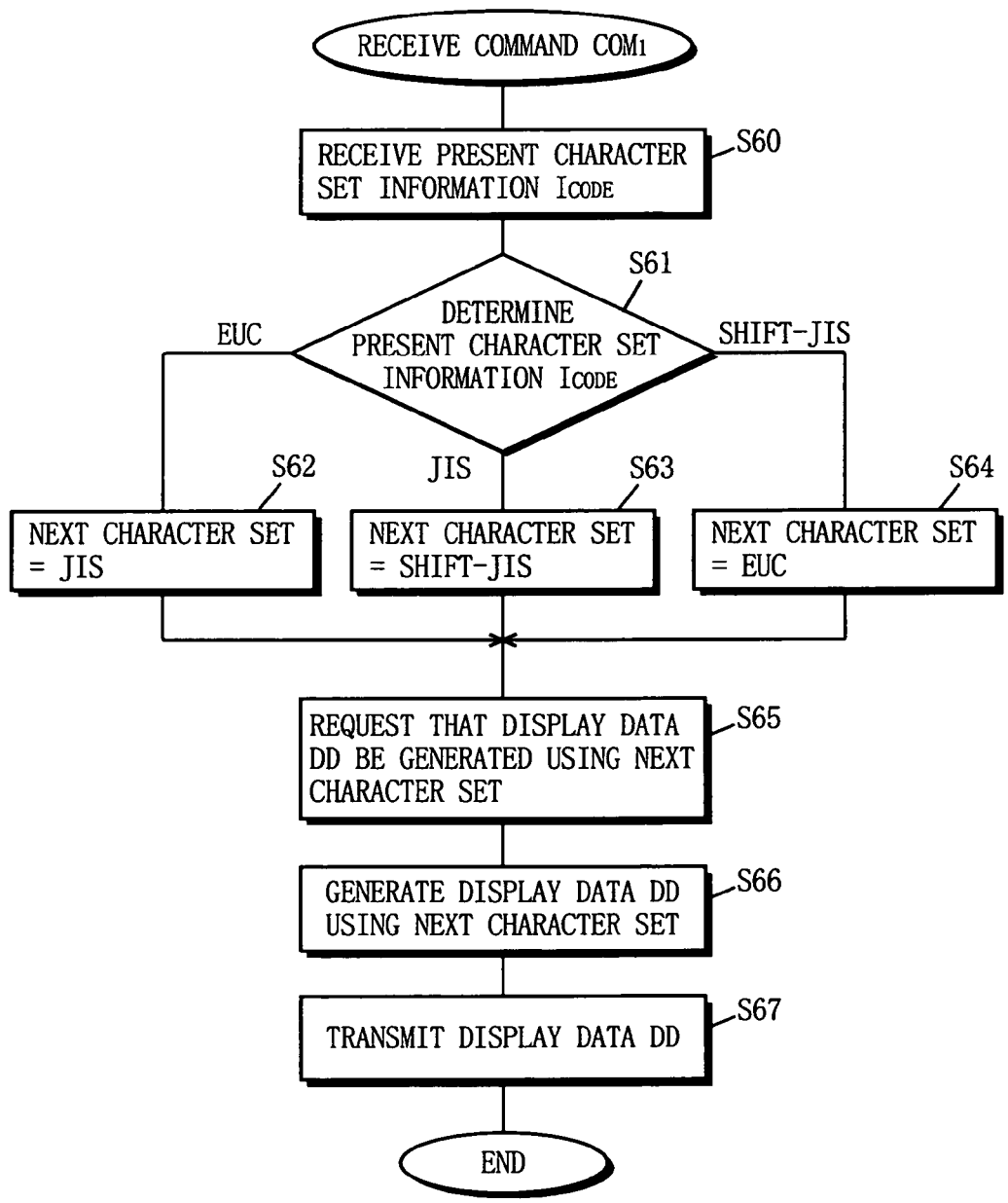
FIG. 6 is a flow chart showing the procedure of switching the character set in the WWW browser $217_1$.

With reference to a flow chart of FIG. 6, how the above structured WWW browser $217_1$ switches the character set is described. Then, with reference to a flow chart of FIG. 7, how the above structured WWW browser $217_1$ switches the display mode is described. Then, with reference to a flow chart of FIG. 9, how the WWW browser 217 operates after the contents are obtained is described.

The contents obtained from the WWW server 201 are first displayed on the display 211 in a certain display mode. Assume, however, that the user cannot read the text of the contents because the correct character set is not set. In such a case, the user operates the key 221 of the input device 22, thereby causing the WWW browser $217_1$ to start the procedure for switching the character set as shown in FIG. 6.

When receiving the command $COM_1$ for switching the character set through the input determination unit 2171, the display mode switching unit 2172 retrieves the character set information $I_{CODE}$ of the text currently being displayed from the second storage unit 2122 (step S60).

Next, the display mode switching unit 2172 determines whether the retrieved character set information $I_{CODE}$ indicates "EUC", "JIS", or "SHIFT-JIS" (step S61).

When determining "EUC", the display mode switching unit 2172 selects "JIS" as the next display mode (the next character set) according to the above described first order (step S62), notifying the update unit 2175 to switch the character set for display from "EUC" to "JIS". When determining "JIS", the display mode switching unit 2172 selects "SHIFT-JIS" as the next display mode according to the first order (step S63), notifying the update unit 2175 to switch the character set from "JIS" to "SHIFT-JIS". When determining "SHIFT-JIS", the display mode switching unit 2172 selects "EUC" as the next display mode according to the first order (step S64), notifying the update unit 2175 to switch the character set from "SHIFT-JIS" to "EUC".

When notified of the next display mode, the update unit 2175 accesses to the second storage unit 2122 to update the display mode (character set) of the contents now on display to the next display mode. The update unit 2175 also requests the display data generator 2176 to generate the display data DD of the contents now on display in the next display mode (step S65).

Upon request for regeneration of the display data DD, the display data generator 2176 refers to the contents currently requested and stored in the first storage unit 2121 to generate the display data DD in the next display mode (step S66). The display data generator 2176 then sends the generated display data DD through the display controller 2111 to the display 211 (step S67).

Figure 7:
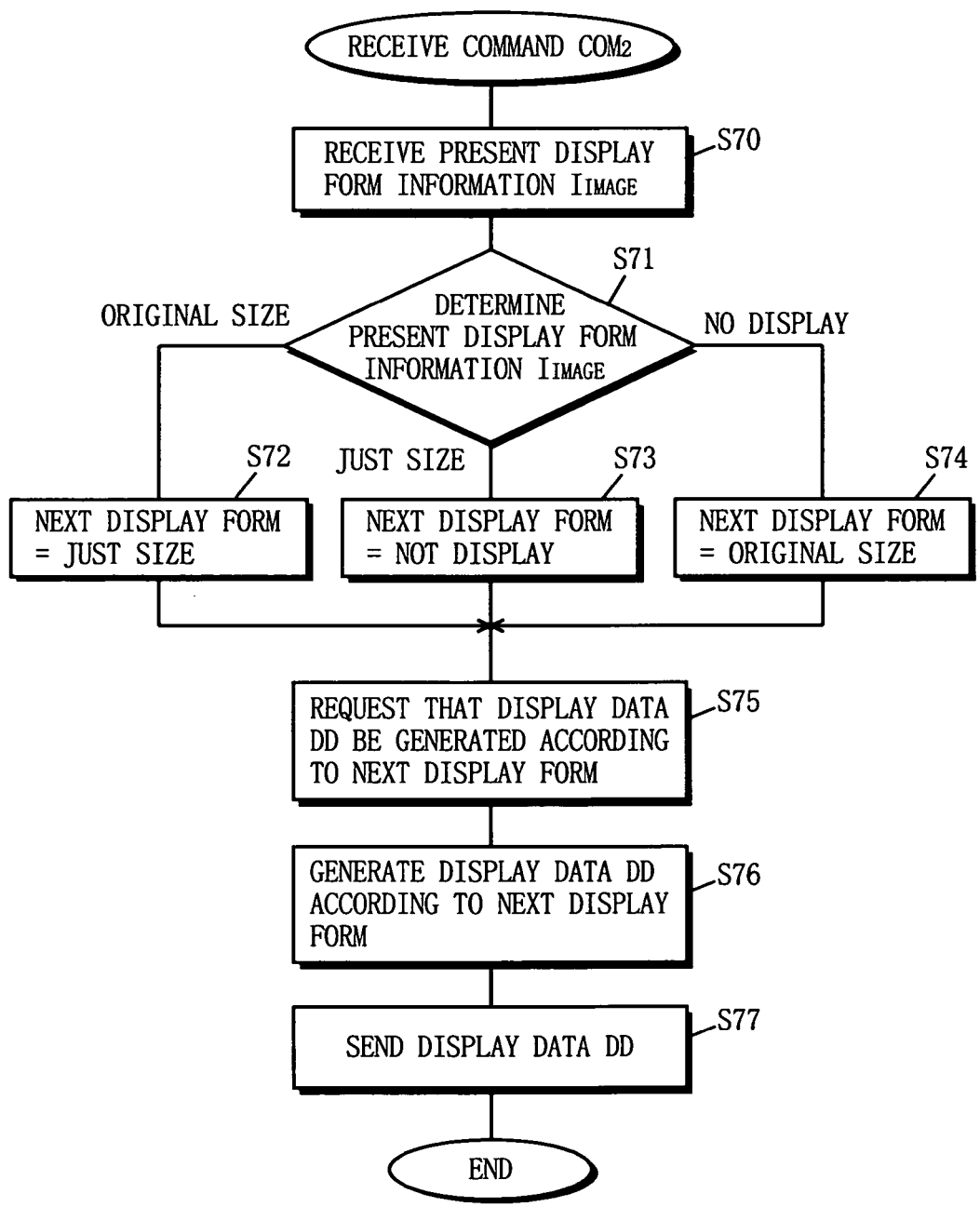
FIG. 7 is a flow chart showing the procedure of switching the image display form in the WWW browser $217_1$.

Now referring to FIG. 7, assume that the user wants to change the form of the image of the contents because the display form is not as desired. In this case, the user operates the input device 22 to instruct the terminal 15 to change the display form, thereby causing the WWW browser $217_1$ to start the procedure of switching display modes.

When receiving the command $COM_2$ for switching the display form through the input determination unit 2171, the display mode switching unit 2172 retrieves the display form information $I_{IMAGE}$ of the image currently being displayed from the second storage unit 2122 (step S70).

Next, the display mode switching unit 2172 determines whether the retrieved display form information $I_{IMAGE}$ indicates "Just size", "Original size", or "No display" (step S71).

When determining "Original size", the display mode switching unit 2172 selects "Just size" as the next display mode (the next display form) according to the above described second order (step S72), notifying the update unit 2175 to switch the display form from "Original size" to "Just size". When determining "Just size", the display mode switching unit 2172 selects "No display" as the next display mode according to the second order (step S73), notifying the update unit 2175 to switch the display form from "Just size" to "No display". When determining "No display", the display mode switching unit 2172 selects "Original size" as the next display mode according to the second order (step S74), notifying the update unit 2175 to switch the display form from "No display" to "Original size".

When notified of the next display mode, the update unit 2175 accesses to the second storage unit 2122 to update the display mode (image display form) of the contents now on display to the next display mode. The update unit 2175 also requests the display data generator 2176 to generate the display data DD of the contents now on display again in the next display mode (step S75).

Upon request for regeneration of the display data DD, the display data generator 2176 refers to the contents currently requested and stored in the first storage unit 2121 to generate the display data DD in the next display mode (step S76). The display data generator 2176 then sends the generated display data DD through the display controller 2111 to the display 211 (step S77).

Figure 8:
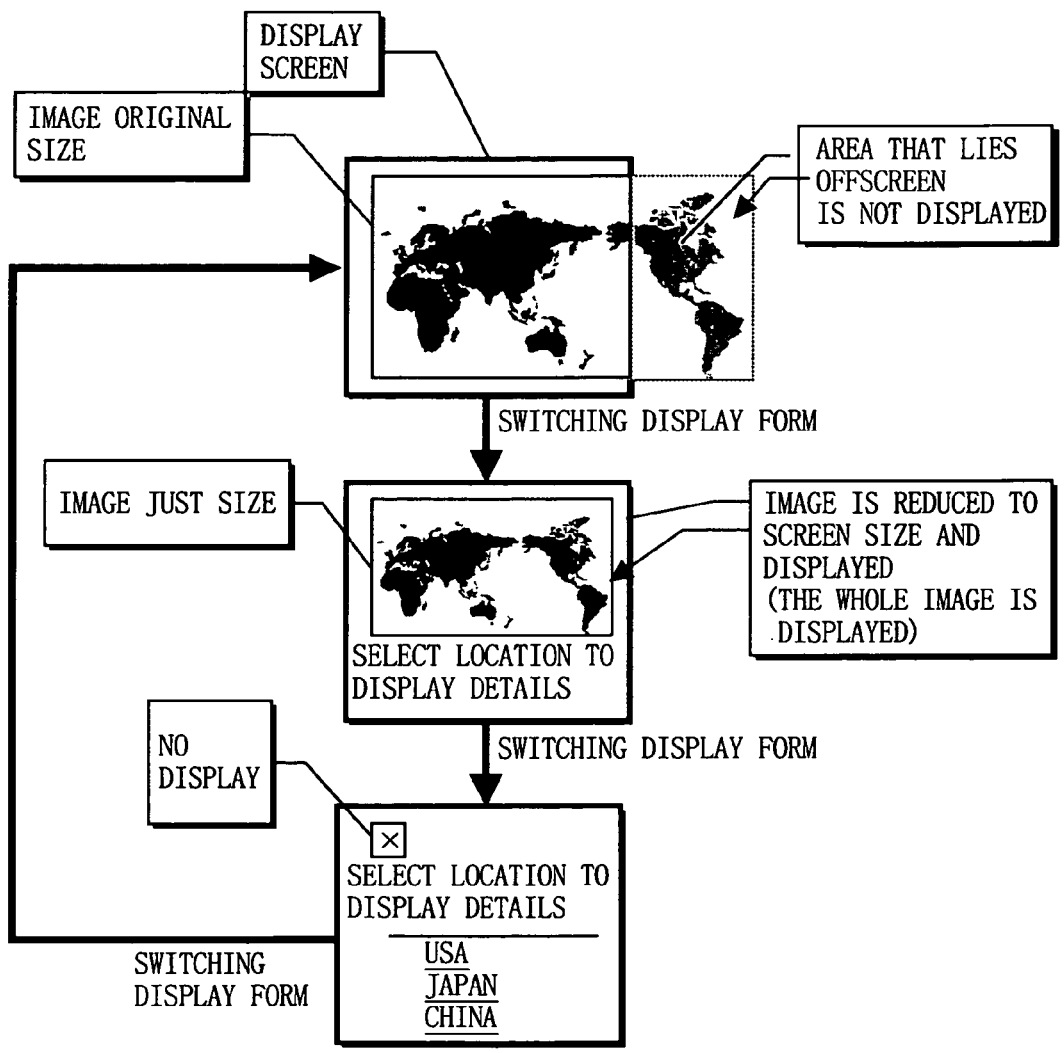
FIG. 8 is a diagram illustrating an example of displays through the operation of switching the display form as shown in FIG. 7.

The WWW browser $217_1$ updates the display mode (character set or display form) of the contents displayed on the screen of the display 211 in the above described manners. With such procedure as shown in FIG. 6, the character set of the text is switched on the screen of the display 211 according to the order whenever the user operates the key 221 to which the display-mode switching function is assigned. Also, with such procedure as shown in FIG. 7, the display form is switched as shown in FIG. 8. Therefore, the user can easily switch the character set and display form without selecting and setting a specific one from a list of a plurality of character sets and display forms. As a result, it is possible to provide the terminal 15 in which a user interface is installed that can easily switch the display mode into the correct character set or a desired display form.

Furthermore, the WWW browser $217_1$ can display the contents using the correct character set without performing automatic selection of the character set. Therefore, the load on the CPU 2101 of relatively low performance can be lightened.

Figure 9:
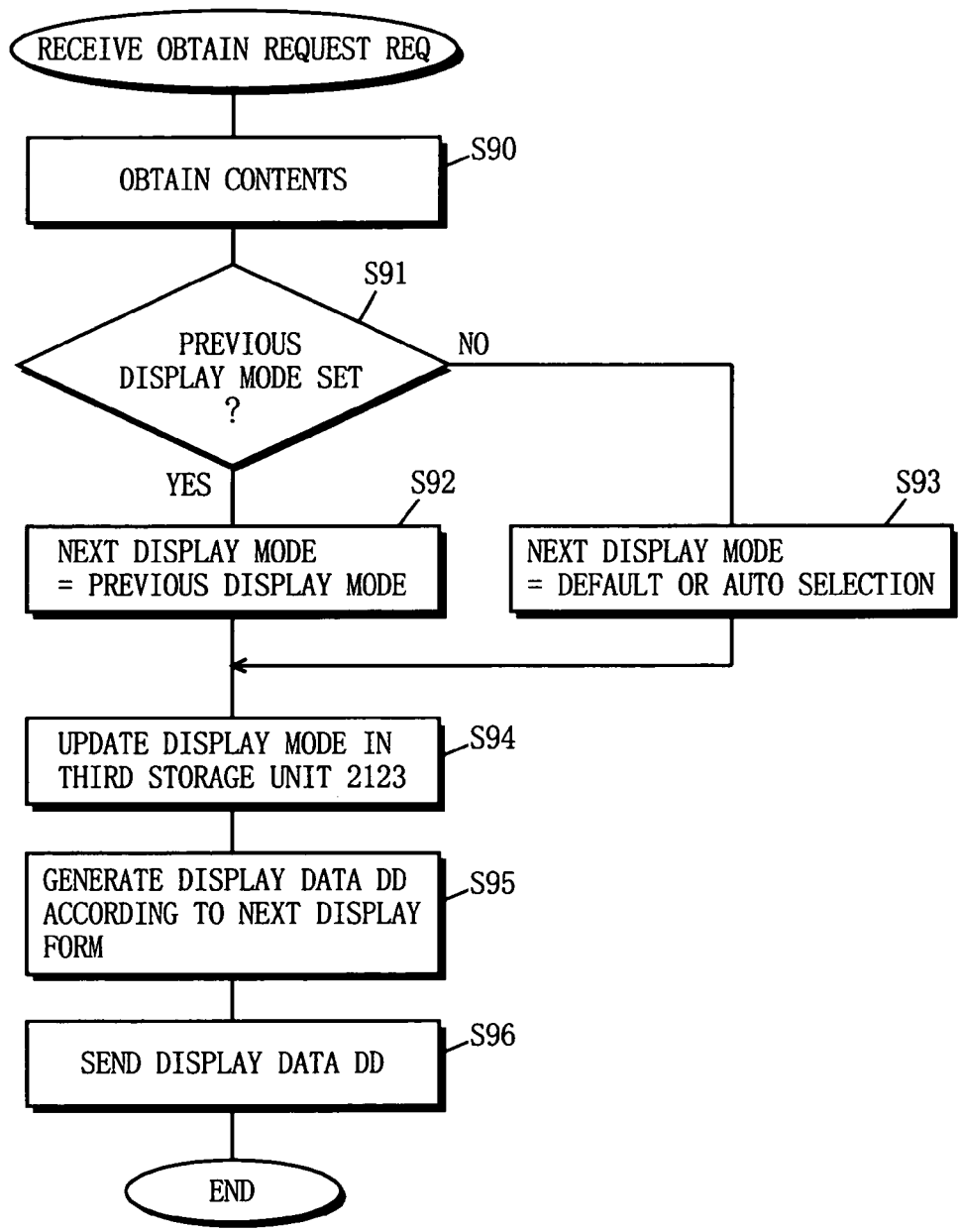
FIG. 9 is a flow chart showing the procedure of obtaining contents through the WWW browser $217_1$ from a WWW server 201 or 202.

In FIG. 9, when receiving the request REQ through the input determination unit 2171, the transmitter/receiver 2173 refers to the third storage unit 2123 to obtain the contents specified by the user from the specified WWW server (step S90). The transmitter/receiver 2173 then stores the obtained contents in the first storage unit 2121, and further updates the management information $MI_{CON}$ in the third storage unit 2123.

When notified by the transmitter/receiver 2173 that the contents have been obtained, the display mode determination unit 2174 refers to the third storage unit 2123 to determine whether the previous display mode of the requested contents has been set or not (step S91).

If determining that the previous display mode has been set, the display mode determination unit 2174 notifies the update unit 2175 of the previous display mode as a next display mode (step S92).

On the other hand, if determining that the previous display mode has not been set, the display mode determination unit 2174 notifies the update unit 2175 of a default display mode or a display mode automatically selected after analysis of the contents as the next display mode (step S93).

The update unit 2175 sets the received next display mode in the second storage unit 2122 as the display mode of the contents currently requested. The update unit 2175 further updates the display mode of the currently-requested contents that is set in the third storage unit 2123 to the received next display mode (step S94). The update unit 2175 also notifies the display data generator 2176 of the received next display mode.

When notified of the next display mode, the display data generator 2176 refers to the currently-requested contents to generate the display data DD in the received next display mode (step S95), and then sends the generated display data DD to the display 211 through the display controller 2111 (step S96). The WWW browser 2171 thus updates the contents being displayed on the display 211.

With the above procedure of FIG. 9, when the WWW browser 2171 newly obtains the contents stored in the first storage unit 2121 from the WWW server 201 and has them displayed again, the contents can be automatically displayed in the previous display mode. This increases the possibility that the user can browse the currently-obtained contents in the correct or desired display mode without operating the key 211. As a result, the number of user's operations of the input device 22 can be reduced, and a simpler user interface can be provided.

Figure 10:
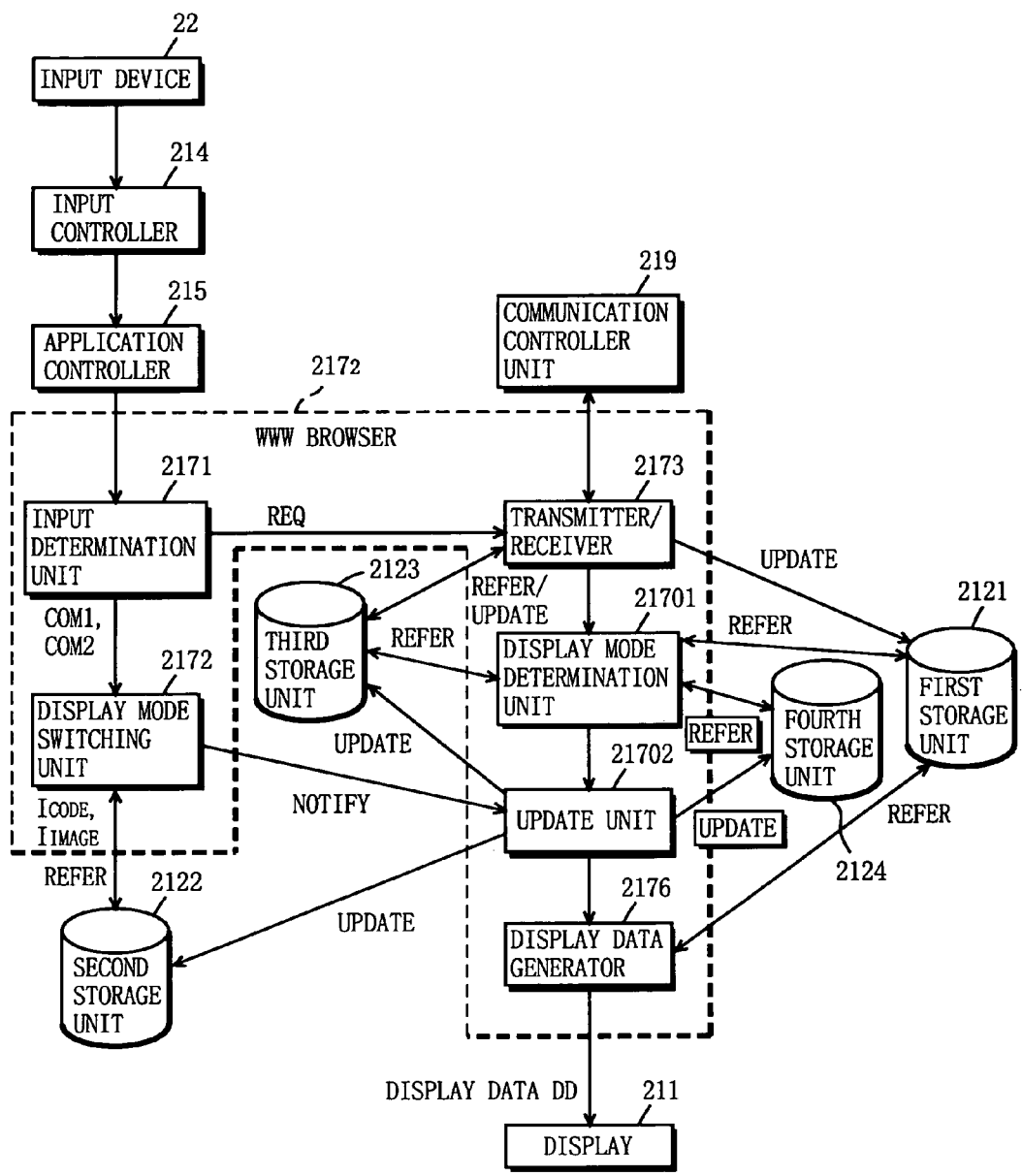
FIG. 10 is a diagram showing a functional block structure of a WWW browser $217_2$.

Next, an example of another structure of the WWW browser 217 is described with reference to FIG. 10. The WWW browser 217 shown in FIG. 10 is hereinafter referred to as a WWW browser $217_2$. In FIG. 10, like the WWW browser $217_1$, the WWW browser $217_2$ includes the input determination unit 2171, the display mode switching unit 2172, the transmitter/receiver 2173, and the display data generator 2176. However, the WWW browser $217_2$ is different from the WWW browser $217_1$ in that the WWW browser $217_2$ includes a display mode determination unit 21701 and an update unit 21702 instead of the display mode determination unit 2174 and the update unit 2175.

The WWW browser 2172 further uses a fourth storage unit 2124 for switching the display mode in addition to the first to third storage units 2121 to 2123. In the present embodiment, part of the storage area of the RAM 2102 is assigned as the fourth storage unit 2124.

Description is now made about the structure of the WWW browser 2172, mainly about the difference from the WWW browser $217_1$.

The display mode determination unit 21701 determines whether the display mode of the contents to be displayed has been set or not. If the previous display mode has been set (that is, when "NULL" has not been set"), the display mode determination unit 21701, like the display mode determination unit 2174, notifies the update unit 2175 of the previous display mode (character set or display form information) as the next display mode.

However, if the display mode has not been set, the display mode determination unit 21701 searches for the display mode previously used by using a source address of history information HI (refer to FIG. 11) stored in the fourth storage unit 2124 as a keyword. If the same source address of the contents to be displayed is present in the history information HI and if the display mode of the same source address has been found, the display mode determination unit 21701 notifies the update unit 21702 of the display mode as the next display mode. On the other hand, if the same source address is not present in the history information HI or if the display mode of the same source address has not been set, the display mode determination unit 21701 notifies the update unit 21702 of a default display mode or a display mode that is automatically selected as the next display mode after analyzing the contents that are stored in the first storage unit 2121.

When notified of the next display mode, the update unit 21702 updates the display mode of the contents that is set in the fourth storage unit 2124 to the next display mode. The update unit 21702 further requests the display data generator 2176 to generate the display data DD of the contents in the received next display mode.

In the fourth storage unit 2124, the history information HI relevant to the contents previously displayed by the display 211 is stored.

FIG. 11 shows an example of the history information HI. In FIG. 11, The history information is generated for each of the contents previously displayed. A piece of history information segments is constructed of, by way of example only, a source address of the contents, a latest display date and time, the number of displays, and previous display mode. In FIG. 11, only the character set information $I_{CODE}$ is shown as the previous display mode. However, the previous display mode is not restricted thereto but may include the display form information $I_{IMAGE}$. Further, the history information HI may include other information according to design specifications of the WWW browser $217_2$.

Figure 12:
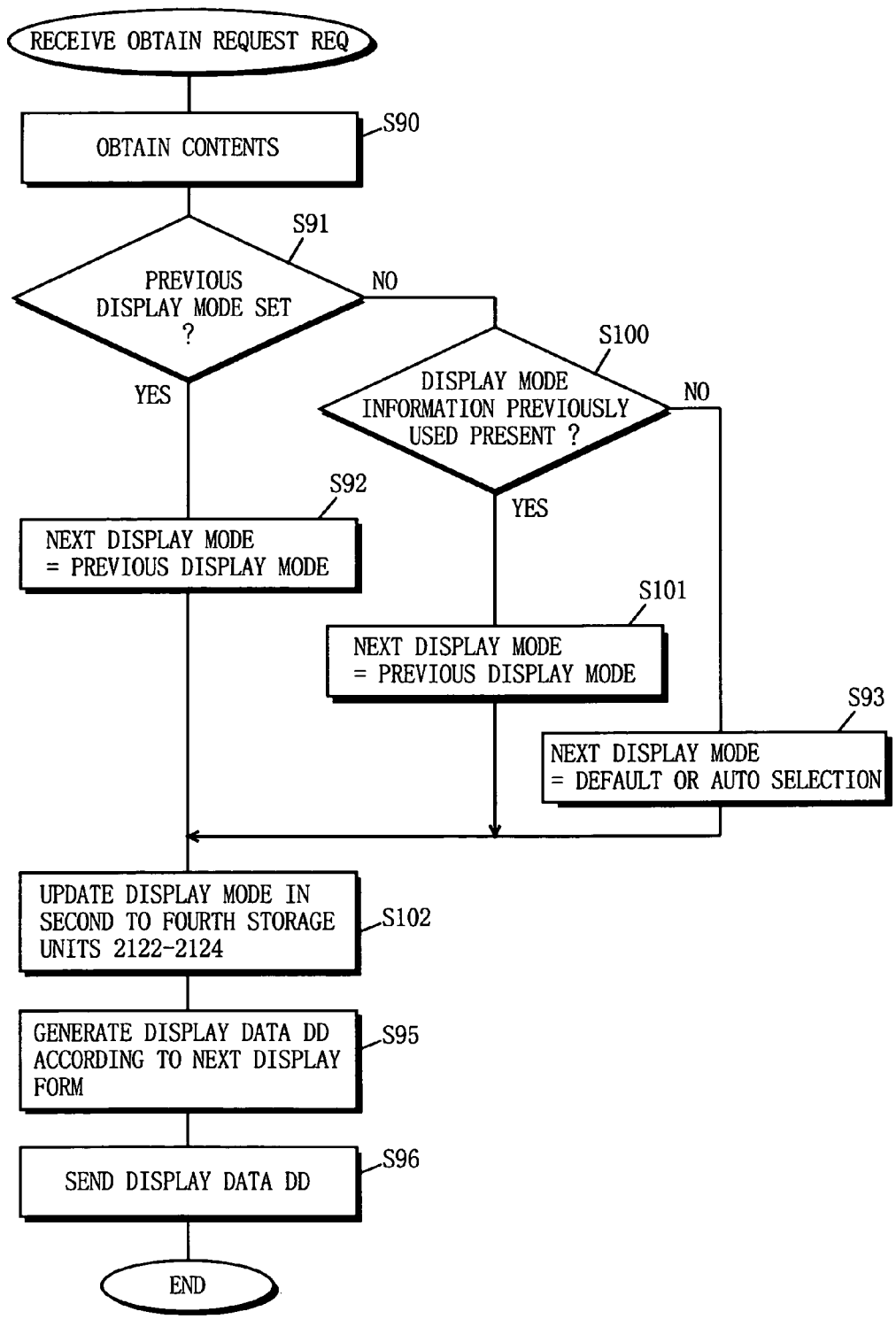
FIG. 12 is a flow chart showing the procedure of obtaining contents through the WWW browser $217_2$ from the WWW server 201.

Described next is the procedure of obtaining the contents by the above structured WWW browser $217_2$ with reference to a flow chart of FIG. 12. The procedure of FIG. 12 is different from that of FIG. 9 in that the procedure of FIG. 12 further includes steps S100 and S101 and newly includes step S102 instead of step S94. Since other steps are the same, the same steps corresponding to those in FIG. 9 are provided with the same step number in FIG. 12, and their description will be simplified.

Upon receipt of the request REQ, the WWW browser $217_2$ obtains the contents requested by the user (step S90), stores the contents in the first storage unit 2121, and further updates the management information $MI_{CON}$ stored in the third storage unit 2123.

Next, the display mode determination unit 21701 refers to the third storage unit 2123 to determine whether the previous display mode of the obtained contents has been set or not (step S91).

If determining that the previous display mode has been set, the display mode determination unit 21701 sets the next display mode, and then notifies the update unit 21702 of the next display mode in the similar manner to that of the WWW browser $217_1$ (step S92).

On the other hand, if determining that the previous display mode has not been set, the display mode determination unit 21701 searches for the display mode information previously used by referring to the source address of the contents in the history information HI (refer to FIG. 11) stored in the fourth storage unit 2124 as a keyword (step S100).

If the display mode of the source address has been found, the display mode determination unit 21701 notifies the update unit 21702 of the found display mode as the next display mode (step S101).

On the other hand, if the display mode of the source address of the contents cannot be found, the display mode determination unit 21701 notifies the update unit 21702 of a default display mode or a display mode after analyzing the contents as the next display mode in a similar manner to that of the WWW browser $217_1$ (step S93).

When notified of the next display mode, the update unit 21702 updates the display mode stored in the second to fourth storage units 2122 to 2124, similarly to the WWW browser $217_1$ (step S102). Here, when notified of the next display mode automatically selected by the display mode determination unit 21701, the update unit 21702 generates a new piece of history information based on the management information $MI_{CON}$ stored in the third storage unit 2123, and then stores the generated history information in the fourth storage unit 2124.

When notified of the next display mode, the display data generator 2176 generates the display data DD similarly to the WWW browser 217, (step S95), and then sends the display data DD to the display 211 (step S96). The WWW browser 2172 thus updates the contents on the screen of the display 211.

Figure 13:
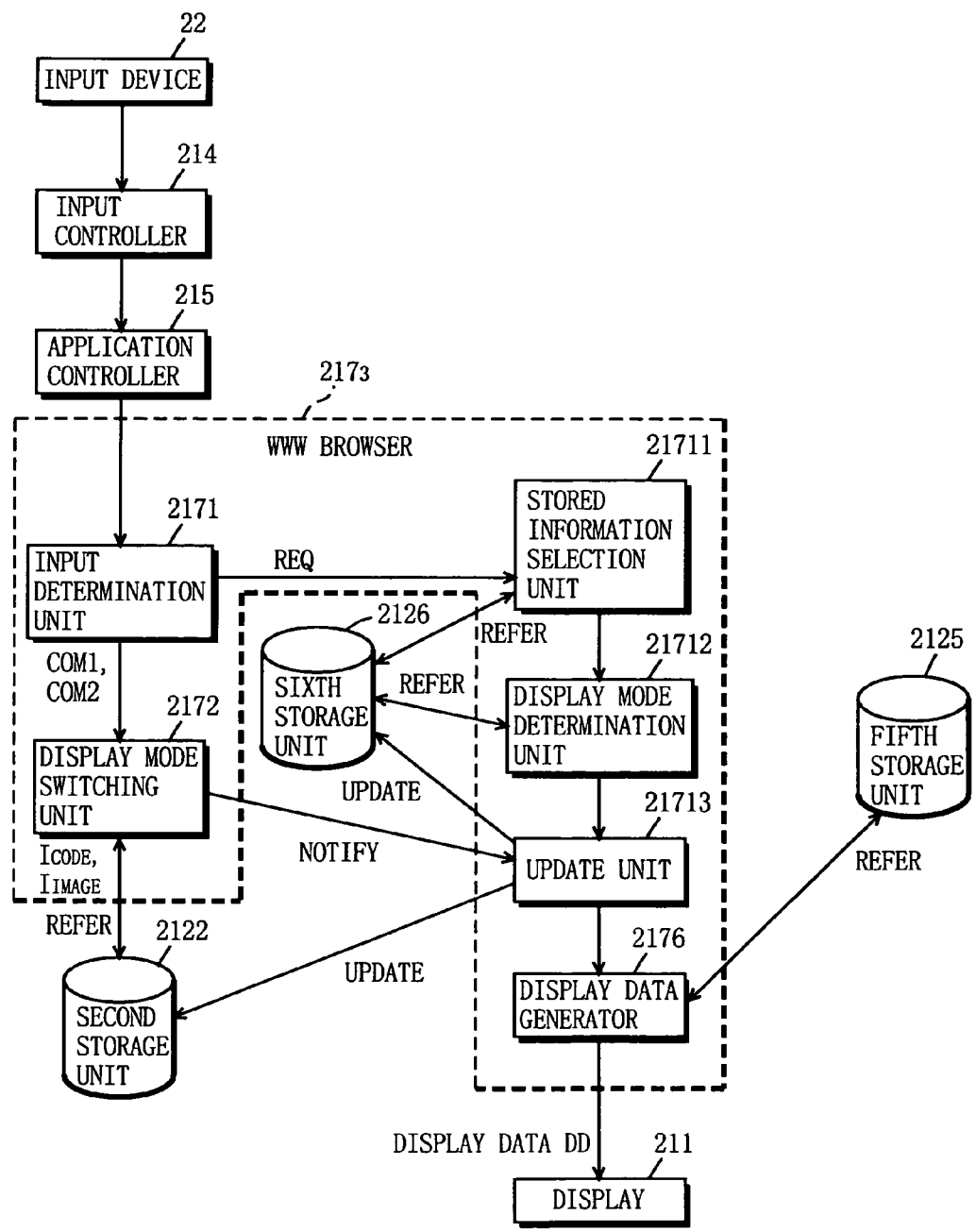
FIG. 13 is a diagram showing a functional block structure of the WWW browser $217_3$.

With the procedure of FIG. 13, when the WWW browser $217_2$ newly obtains the previously-accessed contents from the WWW server 201 and has the contents displayed again, the contents can be automatically displayed in the display mode that was used when the contents from the same server were displayed. It is therefore highly possible for the user to browse the contents newly obtained in the correct or desired display mode without operating the input device 22. As a result, the number of the user's operations of the input device 22 can be reduced, and a simpler user interface can be provided.

Next, an example of another structure of the WWW browser 217 is described with reference to FIG. 13. The WWW browser 217 shown in FIG. 13 is hereinafter referred to as a WWW browser $217_3$. In FIG. 13, the WWW browser $217_3$ includes the input determination unit 2171, the display mode switching unit 2172, and the display data generator 2176, like the WWW browser $217_1$. However, the WWW browser $217_3$ is different from the WWW browser $217_1$ in that the WWW browser $217_3$ includes a stored information selection unit 21711, a display mode determination unit 21712 and an update unit 21713 instead of the transmitter/receiver 2173, the display mode determination unit 2174 and the update unit 2175.

The WWW browser 2173 further uses fifth and sixth storage units 2125 and 2126 for setting the display mode, which will be described later, instead of the first and third storage units 2121 and 2123. In the present embodiment, some parts of the storage area of the RAM 2102 are assigned as the fifth and sixth storage units 2125 and 2126.

Description is now made about the structure of the WWW browser $217_3$, mainly about the difference from the WWW browser $217_1$.

In the fifth storage unit 2125, the contents previously obtained by the terminal 15 from the WWW server 201 and others are stored as local information. Note that the number of contents and total size storable in the fifth storage unit 2125 are limited, like the first storage unit 2121. No local information can be stored in the fifth storage unit over that limitation.

In the sixth storage unit 2126, management information $MI_{LOCAL}$ for managing local information stored in the fifth storage unit 2125 is stored.

FIG. 14 shows an example of the management information $MI_{LOCAL}$. In FIG. 14, the management information is generated for each of the contents previously displayed. A piece of management information $MI_{LOCAL}$ is constructed of, by way of example only, a source address of the contents, date and time when the contents were stored in the fifth storage unit 2125, and previous display mode. Although a URL (Uniform Resource Locator) is used as the source address in FIG. 14, other information can be used as long as it can uniquely specify the storage location of the contents in the WWW server 201.

Upon receipt of the request REQ, the stored information selection unit 21711 refers to the management information $MI_{LOCAL}$ in the sixth storage unit 2126 to determine whether the requested contents are stored in the fifth storage unit 2125 as the local information. If the management information $MI_{LOCAL}$ is present in the sixth storage unit 2126, the local information of the management information $MI_{LOCAL}$ should be stored in the fifth storage unit 2125. In this case, the stored information selection unit 21711 notifies the display mode determination unit 21712 of the information indicating the storage location of the local information.

When notified by the stored information selection unit 21711 that the local information has been stored, the display mode determination unit 21712 retrieves the display mode of the contents to be displayed that was previously used for display from the management information $MI_{LOCAL}$ in the sixth storage unit 2126. The display mode determination unit 21712 then notifies the update unit 21713 of the retrieved previous display mode as the next display mode.

When notified of the next display mode by the display mode determination unit 21712, the update unit 21713 updates the display mode stored in the second and sixth storage units 2122 and 2126 to the next display mode. The update unit 21713 also requests the display data generator 2176 to generate the display data DD of the contents in the received next display mode.

Upon receipt of the request REQ for obtaining the contents, the WWW browser $217_3$ determines whether the requested contents have been stored in the fifth storage unit 2125 or not. If the contents have been stored in the fifth storage unit 2125, the WWW browser $217_3$ obtains the contents from the fifth storage unit 2125 and then instructs the display 211 to display the contents in a predetermined display mode. In other words, it is possible to automatically display the contents in the display mode previously used for display without accessing to the WWW server 201. It is therefore highly possible for the user to browse the contents newly obtained in the correct or desired display mode without operating the input device 22. As a result, the number of the user's operations of the input device 22 can be reduced, and a simpler user interface can be provided.

The present invention is not restricted to the technical field of the above embodiment, and includes such concepts as described below.

In the above embodiment, the terminal 15 displays the contents stored in the WWW server 201. However, the terminal 15 may obtain and display an E-mail stored in the mail server 203. At this time, the mailer 218 operates similarly to the WWW browsers $217_1$ to $217_3$, automatically determining the character set or display form of the E-mail.

In the above embodiment, the display mode includes a character set and display form. The display mode is not restricted to the above, however, and may include a font size, setting information for playing back motion pictures or sounds.

In the above embodiment, a single-byte and multi-byte character set is switched. Alternatively, a language code such as Japanese, Chinese, and Spanish may alternatively be switched.

As to the display mode, a function that enables the user to set a default character set or display form may be added. With such function, when the character set of the text or the display form of the image included in the contents or the E-mail cannot be automatically selected, the WWW browsers $217_1$ to $217_3$ or the mailer 218 refers to the default setting for displaying the contents or the E-mail.

In the above embodiment, the command $COM_1$ or $COM_2$ is sent through operation of the key on the input device 22. Alternatively, however, the input device 22 may send the command $COM_1$ or $COM_2$ by responding to a voice "Next" inputted through the microphone by the user or by responding to a joystick being tilted in a predetermined direction. Further, a graphical button or menu may be displayed on the screen of the display 211 for "switching the display mode". In this case, the user operates the input device 22 to cause such button or menu to make an instruction of "switching the display mode". In response to such instruction, WWW browser 217 switches the display mode.

In the WWW browser $217_1$, the contents stored in the first storage unit 2121 may be stored only within a limited storing period. After the storing period has elapsed, the contents may be automatically deleted. Further, the information stored in the first and third storage units 2121 and 2123 may be managed by using a unique identifier or pointer between these storage units.

Further, in the WWW browser $217_3$, the local information stored in the fifth storage unit 2125 may be overwritten. In this case, a function such as setting specific local information to be inhibited from being overwritten may be added to the WWW browser $217_3$. Furthermore, the local information may be automatically deleted after a predetermined storing period has elapsed.

While the invention has been described in detail, the foregoing description is in all aspects illustrative and not restrictive. It is understood that numerous other modifications and variations can be devised without departing from the scope of the invention.

What is claimed is:

1. A mobile communication terminal device that obtains data including text from an external server through a digital network, said terminal device comprising:

a first storage unit operable to store the data, which is created with a predetermined character code or a predetermined language code, obtained from the external server;

a display data generator operable to generate display data by using a first character code or a first language code based on the data stored in said first storage unit;

a display operable to display the display data generated by said display data generator;

a second storage unit operable to store information which is indicative of the first character code or the first language code used for the display data being currently displayed by said display;

an input unit operable to generate, in response to a user operation, a command which is indicative of switching the first character code or the first language code;

a selection unit operable to access, upon receipt of the command from said input unit, said second storage unit so as to select a next character code or a next language code in a predetermined order from among a predetermined plurality of character codes or language codes which are different from one another and which are usable by said display data generator; and an updating unit operable to update the information stored in said second storage unit to information which is indicative of the next character code or the next language code selected by said selection unit;

wherein said display data generator is operable to regenerate display data, based on the data stored in said first storage unit, with the next character code or the next language code selected by said selection unit as the first character code or the first language code;

wherein said display is operable to display the display data regenerated by said display data generator; and wherein said input unit comprises a key which activates the command for switching the character code when the user operation corresponds to one pressing of said key.

2. The terminal device according to claim 1, wherein the data stored in said first storage unit is described in HTML (Hyper Text Markup Language).

3. The terminal device according to claim 1, wherein the data stored in said first storage unit is an electronic mail including at least text.

4. The terminal device according to claim 1, wherein said terminal device is adapted to be able to perform telephony communication, and a communication protocol for accessing the external server is implemented in said terminal device.

5. The terminal device according to claim 1, further comprising:

a third storage unit operable to temporarily store the data obtained from the external server;

a determination unit operable to determine the first character code or the first language code to be used for the display data stored in said third storage unit; and a fourth storage unit operable to store management information including a source address of the data stored in said third storage unit and the first character code or the first language code previously used for displaying the data; wherein said determination unit is operable to determine that the data stored in said third storage unit is displayed with the first character code or the first language code previously used by referring to the management information in said fourth storage unit.

6. The terminal device according to claim 1, further comprising:

a determination unit operable to determine the first character code or the first language code for use in displaying the obtained data; and a third storage unit operable to store history information including a source address of data previously obtained and the character code or the language code previously used for displaying the data; wherein said determination unit is operable to search said third storage unit for history information including a source address as the source address of new data when the new data is obtained from the external server, and determine that the new data is displayed with the character code or the language code included in the history information as the first character code or the first language code.

7. The terminal device according to claim 1, further comprising:

a determination unit operable to determine the first character code or the first language code for use in displaying the obtained data;

a third storage unit operable to store the data being displayed as local information; and a fourth storage unit operable to store management information including the first character code or the first language code used for storing the local information in said third storage unit; wherein said determination unit is operable to search said fourth storage unit for management information of the local information when the local information stored in said third storage unit is to be displayed on the screen as data, and determine that the local information is displayed on the screen using the used first character code or the used first language code included in the management information when the management information is found.

8. A method for displaying data including text obtained from an external server on a screen in a mobile communication terminal which is capable of accessing the external server through a digital network, said method comprising:

storing the data, which is created with a predetermined character code or a predetermined language code, obtained from the external server;

generating display data by using a first character code or a first language code based on the stored data;

displaying the generated display data;

storing information which is indicative of the first character code or the first language code and which is used for the display data being currently displayed by said displaying of the generated display data;

generating, in response to a user operation, a command which is indicative of switching the first character code or the first language code;

selecting, upon receipt of the generated command, a next character code or a next language code, in a predetermined order from among a predetermined plurality of character codes or language codes which are different from one another and which are usable in the display data;

activating the command for switching the character code when the user operation corresponds to one pressing of a key of the mobile communication terminal;

regenerating display data, based on the stored data, with the selected next character code or the selected next language code as the first character code or the first language code;

displaying the regenerated display data; and updating the stored information to information which is indicative of the selected next character code or the selected next language code.

9. The terminal device according to claim 1, further comprising a radio controller operable to output modulated carrier signals to at least one base station when said terminal device is located within a service area of the at least one base station, and to receive modulated carries signals from the at least one base station when said terminal device is located within the service area of the at least one base station;

wherein said radio controller is operable to perform wireless communication through radio waves with the at least one base station to obtain and request the data from the external server so as to perform at least one of telephony, browser and mail applications in said terminal device.

10. The method according to claim 8, further comprising:

outputting and receiving carrier signals to at least one base station when the mobile communication terminal is located within a service area of the at least one base station; and performing wireless communication through radio waves with the at least one base station to obtain and request the data from the external server so as to perform at least one of telephony, browser and mail applications in the mobile communication terminal.

* * * * *